US012775126B2

(12) United States Patent
Sohn et al.

(10) Patent No.: US 12,775,126 B2
(45) Date of Patent: Oct. 27, 2026

(54) OPTICAL PROCESSING APPARATUS USING RETROREFLECTION

(71) Applicant: ELECTRONICS AND TELECOMMUNICATIONS RESEARCH INSTITUTE, Daejeon (KR)

(72) Inventors: Jong Moo Sohn, Daejeon (KR); Jin Hwa Gene, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 234 days.

(21) Appl. No.: 18/761,991

(22) Filed: Jul. 2, 2024

(65) Prior Publication Data

US 2025/0130353 A1 Apr. 24, 2025

(30) Foreign Application Priority Data

Oct. 19, 2023 (KR) ........................ 10-2023-0140538

(51) Int. Cl.
*G02B 5/126* (2006.01)
*G02F 1/01* (2006.01)
(Continued)

(52) U.S. Cl.
CPC ........... *G02B 5/126* (2013.01); *G02F 1/0126* (2013.01); *G02F 2203/12* (2013.01); *H04N 25/71* (2023.01); *H04N 25/76* (2023.01)

(58) Field of Classification Search
CPC ...... G02B 5/126; G02F 1/0126; H04N 25/76; H04N 25/71
See application file for complete search history.

(56) References Cited

U.S. PATENT DOCUMENTS

| | | | |
|---|---|---|---|
| 5,148,496 | A | 9/1992 | Anderson |
| 5,418,380 | A | 5/1995 | Simon et al. |

(Continued)

FOREIGN PATENT DOCUMENTS

| | | |
|---|---|---|
| WO | 2022/031982 A1 | 2/2022 |
| WO | 2022/170004 A1 | 8/2022 |

OTHER PUBLICATIONS

Ping Xu et al., "Planar optical correlators integrated with binary optical lens," Optics Express, 2015, vol. 23, No. 5, pp. 6773-6779.

*Primary Examiner* — Lucy P Chien

(57) ABSTRACT

Provided is an optical processing apparatus including a light source configured to generate light, a first spatial light modulator provided on a reference plate and configured to modulate light, a first retroreflective lens provided over the first spatial light modulator and configured to perform optical Fourier transform on the light, a second spatial light modulator provided adjacent to the first spatial light modulator on the reference plate and configured to receive the light from the first retroreflective lens to re-modulate the light, a second retroreflective lens provided over the second spatial light modulator and configured to perform optical inverse Fourier transform on the light, and an optical detector provided adjacent to the second spatial light modulator on the reference plate and configured to receive the light from the second retroreflective lens to acquire an image detection signal.

20 Claims, 6 Drawing Sheets

(51) Int. Cl.
*H04N 25/71* (2023.01)
*H04N 25/76* (2023.01)

(56) References Cited

U.S. PATENT DOCUMENTS

| | | | | |
|---|---|---|---|---|
| 6,080,994 | A * | 6/2000 | Carrott | G06E 3/005<br>250/559.44 |
| 6,163,403 | A | 12/2000 | Carrott et al. | |
| 6,247,037 | B1 | 6/2001 | O'Callaghan | |
| 6,369,933 | B1 | 4/2002 | O'Callaghan | |
| 7,133,194 | B1 | 11/2006 | Kwon et al. | |
| 7,450,799 | B2 * | 11/2008 | Selbrede | G02B 6/0053<br>359/853 |
| 7,747,102 | B2 | 6/2010 | New et al. | |
| 8,696,137 | B2 | 4/2014 | Lin et al. | |
| 9,453,947 | B2 * | 9/2016 | Arbabi | H04B 10/1123 |
| 9,574,868 | B2 | 2/2017 | Shaked et al. | |
| 2004/0075880 | A1 | 4/2004 | Pepper et al. | |
| 2009/0316539 | A1 * | 12/2009 | Mikami | G11B 7/1356 |
| 2022/0137387 | A1 | 5/2022 | Lee et al. | |
| 2023/0298145 | A1 | 9/2023 | Miscuglio et al. | |
| 2023/0376741 | A1 | 11/2023 | Bowen et al. | |

* cited by examiner

OPTICAL PROCESSING APPARATUS USING RETROREFLECTION

CROSS-REFERENCE TO RELATED APPLICATIONS

This U.S. non-provisional patent application claims priority under 35 U.S.C. § 119 of Korean Patent Application No. 10-2023-0140538, filed on Oct. 19, 2023, the entire contents of which are hereby incorporated by reference.

BACKGROUND

The present disclosure herein relates to an optical processing apparatus, and more particularly, to an optical processing apparatus using retroreflection.

As a method for increasing a processing speed and energy efficiency in a machine-learning and artificial intelligence field, it is being studied about a method for calculating a convolution in a three-dimensional free space using an optical correlator that is one of optical computing apparatuses. The optical correlator typically called as a 4f system may include a coherent light source, at least one spatial light modulator for an image and a kernel (a filter), a lens for Fourier transform and inverse Fourier transform, and an output detection apparatus. The optical correlator may calculate a convolution of the image and the kernel.

SUMMARY

The present disclosure provides an optical processing apparatus include: a light source configured to generate light; a first spatial light modulator provided on a reference plate and configured to modulate light; a first retroreflective lens provided over the first spatial light modulator and configured to perform optical Fourier transform on the light; a second spatial light modulator provided adjacent to the first spatial light modulator on the reference plate and configured to receive the light from the first retroreflective lens to re-modulate the light; a second retroreflective lens provided over the second spatial light modulator and configured to perform optical inverse Fourier transform on the light; and an optical detector provided adjacent to the second spatial light modulator on the reference plate and configured to receive the light from the second retroreflective lens to acquire an image detection signal.

In an embodiment, each of the first and second retroreflective lenses may include a V-shaped retroreflector.

In an embodiment, each of the first retroreflective lens and the second retroreflective lens may further include an inner optical Fourier transform lens provided on a center plane of the retroreflector.

In an embodiment, the inner optical Fourier transform lens of the first retroreflective lens may be disposed at a center of an optical path from the first spatial light modulator to the second spatial light modulator, and a focal length of the inner optical Fourier transform lens may be half a length of the optical path.

In an embodiment, the inner optical Fourier transform lens of the second retroreflective lens may be disposed at a center of an optical path from the second spatial light modulator to the optical detector, and a focal length of the inner optical Fourier transform lens may be half a length of the optical path.

In an embodiment, each of the first and second retroreflective lenses may further include at least one wedge prism provided separately or in common in both sides of the retroreflector.

In an embodiment, each of the first and second retroreflective lenses may further include a plurality of outer optical Fourier transform lenses in both sides of the retroreflector.

In an embodiment, a length of an optical path from the first spatial light modulator to the outer optical Fourier transform lens in one side of the retroreflector of the first retroreflective lens may be equal to a front focal length of the plurality of outer optical Fourier transform lenses, and a length of an optical path from the outer optical Fourier transform lens in another side of the retroreflector to the second spatial light modulator may be equal to a back focal length of the plurality of outer optical Fourier transform lenses.

In an embodiment, a length of an optical path from the second spatial light modulator to the outer optical Fourier transform lens in one side of the retroreflector of the second retroreflective lens may be equal to a front focal length of the plurality of outer optical Fourier transform lenses, and a length of an optical path from the outer optical Fourier transform lens in another side of the retroreflector to the optical detector may be equal to a back focal length of the plurality of outer optical Fourier transform lenses.

In an embodiment, the optical processing apparatus may further include at least one wedge prism provided separately or in common over the outer optical Fourier transform lenses of the first and second retroreflective lenses.

In an embodiment, one side of the first retroreflective lens may be aligned with the first spatial light modulator, and another side is aligned with the second spatial light modulator.

In an embodiment, the first retroreflective lens may be aligned with the first spatial light modulator, and the second retroreflective lens may be aligned with the second spatial light modulator.

In an embodiment, the first retroreflective lens may be aligned with the second spatial light modulator, and the second retroreflective lens may be aligned with the optical detector.

In an embodiment, the first retroreflective lens and the second retroreflective lens may be arranged at a same distance in a normal direction to a plane of the reference plate.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
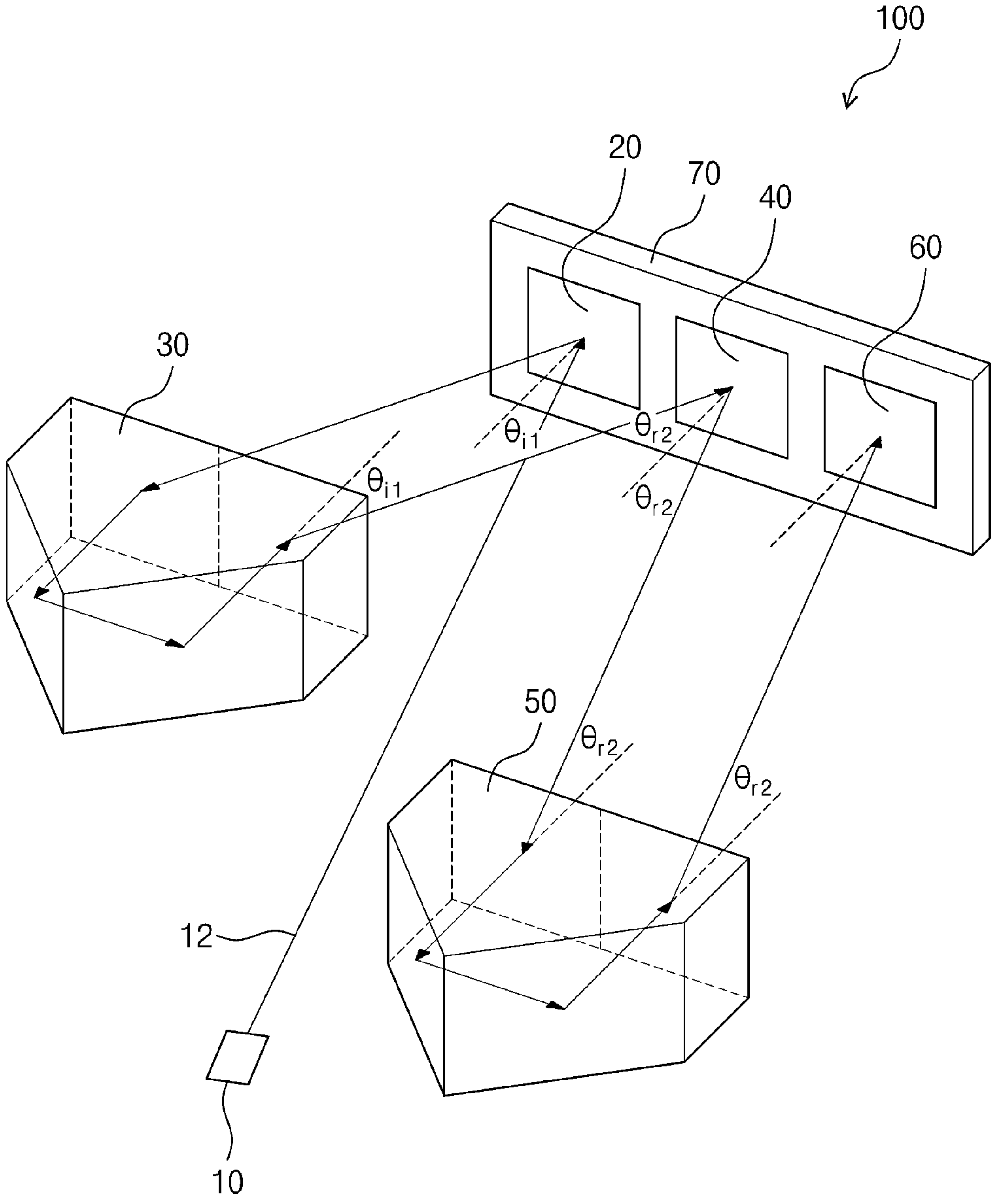
FIG. 1 is a perspective view showing an example optical processing apparatus according to the present inventive concept.

Hereinafter, specific embodiments will be described in detail with reference to the accompanying drawings. Advantages and features of the present invention, and methods for achieving the same will be cleared with reference to exemplary embodiments described later in detail together with the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art. The present disclosure is defined by only scopes of the claims. Throughout this specification, like numerals refer to like elements.

The terms and words used in the following description and claims are to describe embodiments but are not limited the inventive concept. As used herein, the singular forms "a", "an" and "the" are intended to include the plural forms as well, unless the context clearly indicates otherwise. It will be further understood that the terms "comprises" and/or "comprising" used herein specify the presence of stated components, operations and/or elements but do not preclude the presence or addition of one or more other components, operations and/or elements. In addition, as just exemplary embodiments, reference numerals shown according to an order of description are not limited to the order.

FIG. 1 shows an example optical processing apparatus 100 according to the present inventive concept.

Referring to FIG. 1, the optical processing apparatus 100 may include a light source 10, a first spatial light modulator 20, a first retroreflective lens 30, a second spatial light modulator 40, a second retroreflective lens 50, and an optical detector 60.

The light source 10 may generate light 12. The light source 10 may include a display apparatus.

The first spatial light modulator 20 may be provided on a reference plate 70. The first spatial light modulator 20 may receive the light 12 from the light source 10. The first spatial light modulator 20 may modulate the light 12.

The first retroreflective lens 30 may be provided over the first spatial light modulator 20. The first retroreflective lens 30 may receive the light 12 from the first spatial light modulator 20, and reflect the light 12 to the second spatial light modulator 40. The first retroreflective lens 30 may perform optical Fourier transform on the light 12.

The second spatial light modulator 40 may be provided adjacent to the first spatial light modulator 20 on the reference plate 70. The second spatial light modulator 40 may receive the light 12 from the first retroreflective lens 30 to re-modulate the light 12.

The second retroreflective lens 50 may be provided over the second spatial light modulator 40. The second retroreflective lens 50 may be the same as the first retroreflective lens 30. The second retroreflective lens 50 may receive the light 12 from the second spatial light modulator 40 to reflect the light 12 to the optical detector 60. The second retroreflective lens 50 may perform optical inverse Fourier transform on the light 12.

The optical detector 60 may be provided adjacent to the second spatial light modulator 40 on the reference plate 70. The optical detector 60 may receive the light 12 from the second retroreflective lens 50 to acquire an image signal. The optical detector 60 may include a CMOS sensor or a CCD sensor, but is not limited thereto.

The first retroreflective lens 30 and the second retroreflective lens 50 may be disposed at the same distance in the normal direction to the plane of the reference plate 70.

Therefore, the optical processing apparatus 100 of the inventive concept may use the first retroreflective lens 30 and the second retroreflective lens 50 to easily align the first spatial light modulator 20, the second spatial light modulator 40, and the optical detector 60 on the reference plate 70.

Figure 2:
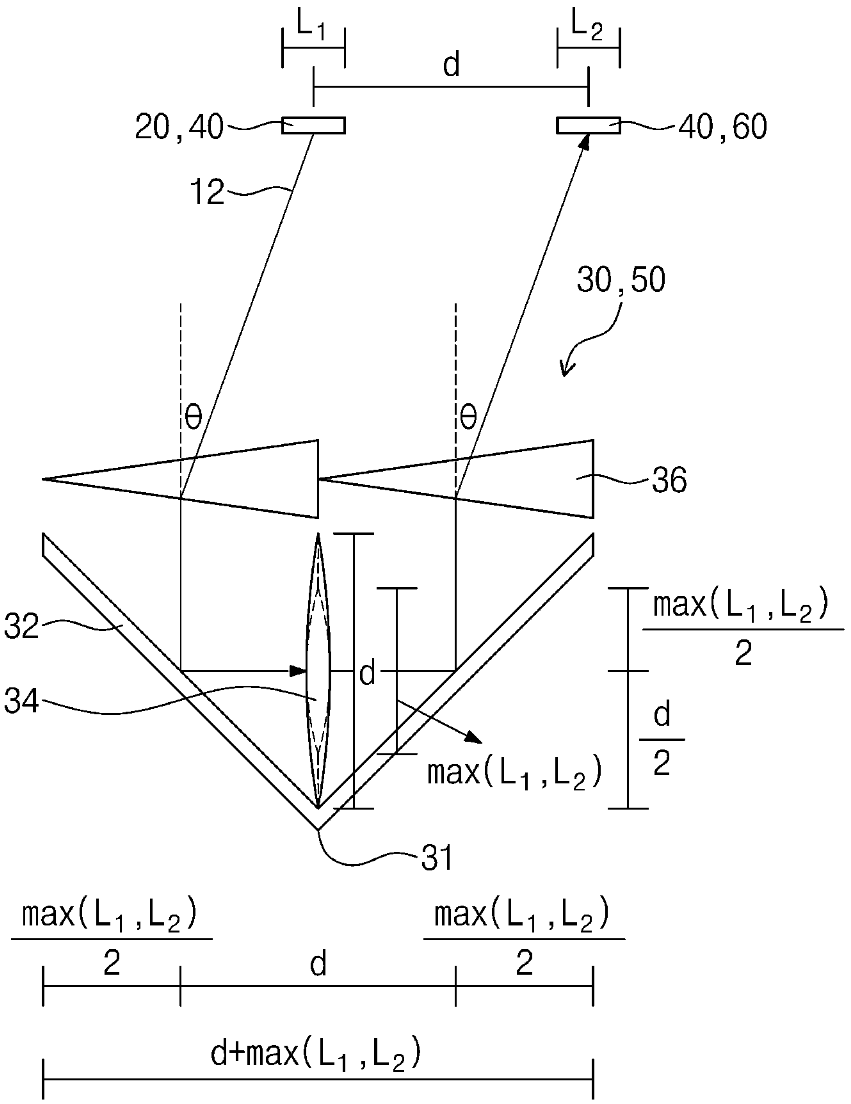
FIG. 2 is a cross-sectional view showing example first and second retroreflective lenses of FIG. 1.

FIG. 2 is a cross-sectional view showing example first and second retroreflective lenses of FIG. 1. Hereinafter, the description will be based on the first retroreflective lens 30 and the same is similarly applied to the second retroreflective lens 50.

Referring to FIG. 2, the first retroreflective lens 30 may be a symmetric retroreflective lens.

According to an example, the first retroreflective lens 30 may include a retroreflector 32, an inner optical Fourier transform lens 34, and one or more wedge prisms 36.

The retroreflector 32 may have a V shape. The retroreflector 32 may be perpendicularly bent on the center plane 31. The minimum width W of the retroreflector 32 is the sum (d+Lmax) of the distance d between the first spatial light modulator 20 and the second spatial light modulator 40 and the larger value (Lmax=max(L1, L2)) between aperture lengths (L1, L2) of the first spatial light modulator 20 and the second spatial light modulator 40, and the maximum width is double the distance d between the first spatial light modulator 20 and the second spatial light modulator 40. The depth D of the retroreflector 32 may be half the width.

The optical Fourier transform lens 34 may be provided on the center plane 31 of the retroreflector 32. The aperture of the optical Fourier transform lens 34 may be the same or greater than the depth of the retroreflector 32. The optical axis of the optical Fourier transform lens 34 on the center plane 31 of the retroreflector 32 may be disposed at a point d/2 in the depth direction of the retroreflector 32.

The wedge prisms 36 may be provided one by one between the retroreflector 32 and the first and second spatial light modulators 20 and 40, and in both sides of the retroreflector 32. The wedge prisms 36 may change a propagation path of the light 12 by an angle of θ to align with the optical axis of the optical Fourier transform lens 34.

According to the types of the first spatial light modulator 20 and the second spatial light modulator 40 and the position of the first retroreflective lens 30, the wedge prisms 36 may be omitted when the propagation path of the light 12 is not required to be changed, The distance of the light path from the first spatial light modulator 20 to the optical Fourier transform lens 34 of the first retroreflective lens 30 is the same as that from the optical Fourier transform lens 34 of the first retroreflective lens 30 to the second spatial light modulator 40, and is also same as the focal length of the optical Fourier transform lens 34 of the first retroreflective lens 30.

Figure 3:
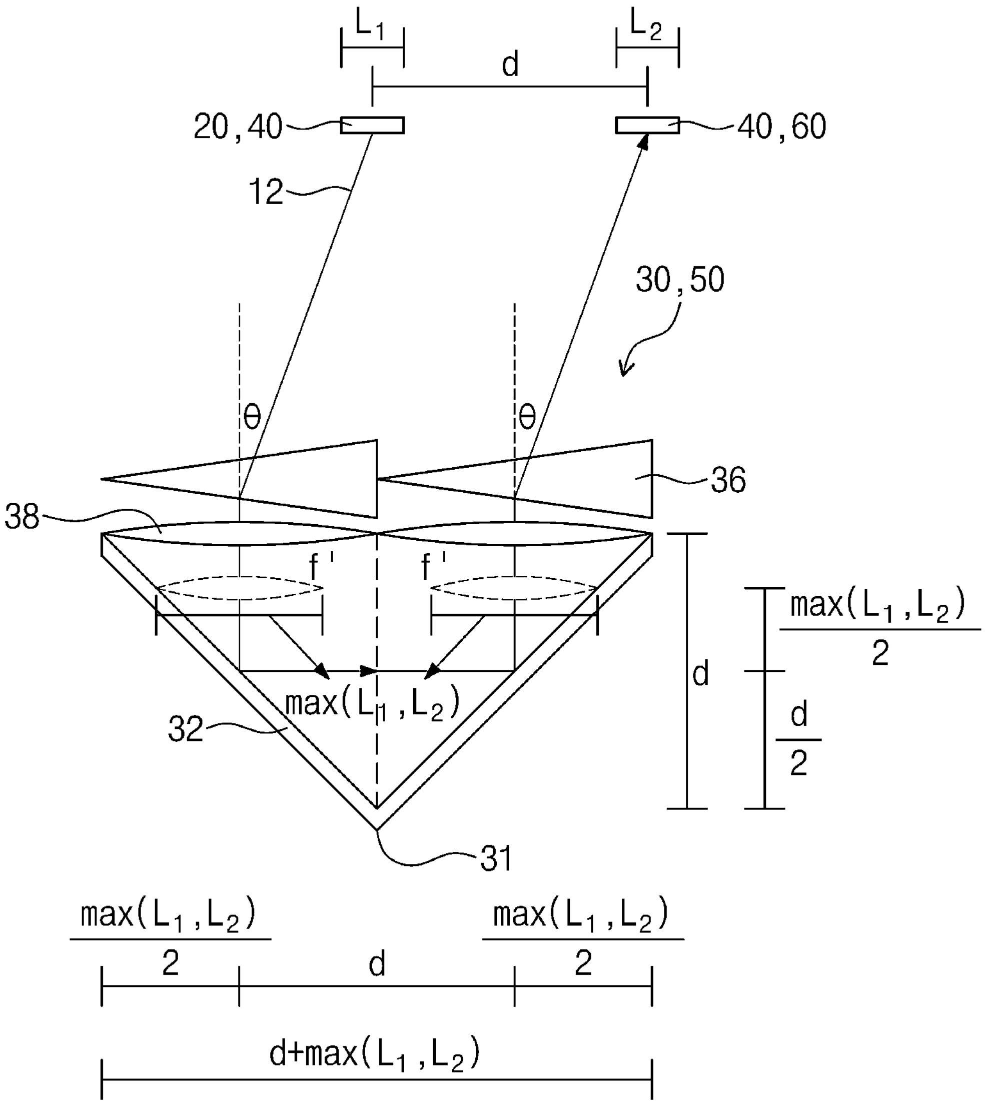
FIG. 3 is a cross-sectional view showing example first and second retroreflective lenses of FIG. 1.

FIG. 3 shows examples of the first and second retroreflective lenses 30 and 50 of FIG. 1. Hereinafter, the description will be based on the first retroreflective lens 30 and the same is similarly applied to the second retroreflective lens 50.

Referring to FIG. 3, the inner optical Fourier transform lens 34 having the focal length f of FIG. 2 may be replaced with two outer optical Fourier transform lenses 38 having the same focal length f'.

The outer optical Fourier transform lenses 38 are disposed at the same distance on the optical paths in both sides of the center plane 31 of the retroreflector 32. An interval between the optical axes of the outer optical Fourier transform lenses 38 may be the same as the distance d between the first spatial light modulator 20 and the second optical light modulator 40. An optical path distance between the outer optical Fourier transform lenses 38 may be the same as the width W of the retroreflector 32. Namely, the reciprocal of the equivalent focal length $f_{eq}$ of the outer optical Fourier transform lenses 38 may be calculated as the difference between 2/f and W/ff'.

The distance from the first spatial light modulator 20 to the center of one of the outer optical Fourier transform lenses 38 may be a frontal focal length (FFL), and the distance from the center of the other of the outer optical Fourier transform lenses 38 to the second spatial light modulator 40 may be a back focal length (BFL). The focal lengths f of the outer optical Fourier transform lenses 38 are the same, and thus the FFL may be the same as the BFL and calculated as a multiplication of the equivalent focal length $f_{eq}$ and 1−W/f'.

The apertures of the outer optical Fourier transform lenses 38 may be equal to or greater than a larger value ($L_{max}$=max ($L_1$, $L_2$)) among aperture lengths ($L_1$, $L_2$) of the first spatial light modulator 20 and the second spatial light modulator 40.

Although not shown, pairs of the wedge prisms 36 and the outer optical Fourier transform lenses 38 may be replaced with wedge lenses.

The retroreflector 32 may be replaced with a right-angle mirror or a right-angle prism, and all of the outer optical Fourier transform lenses 38 and the wedge prisms 36 may be composed of a single-material structure. Here, instead of a thin lens equation, a thick lens equation may be used to reflect the refractive index of the single-material structure.

Figure 4:
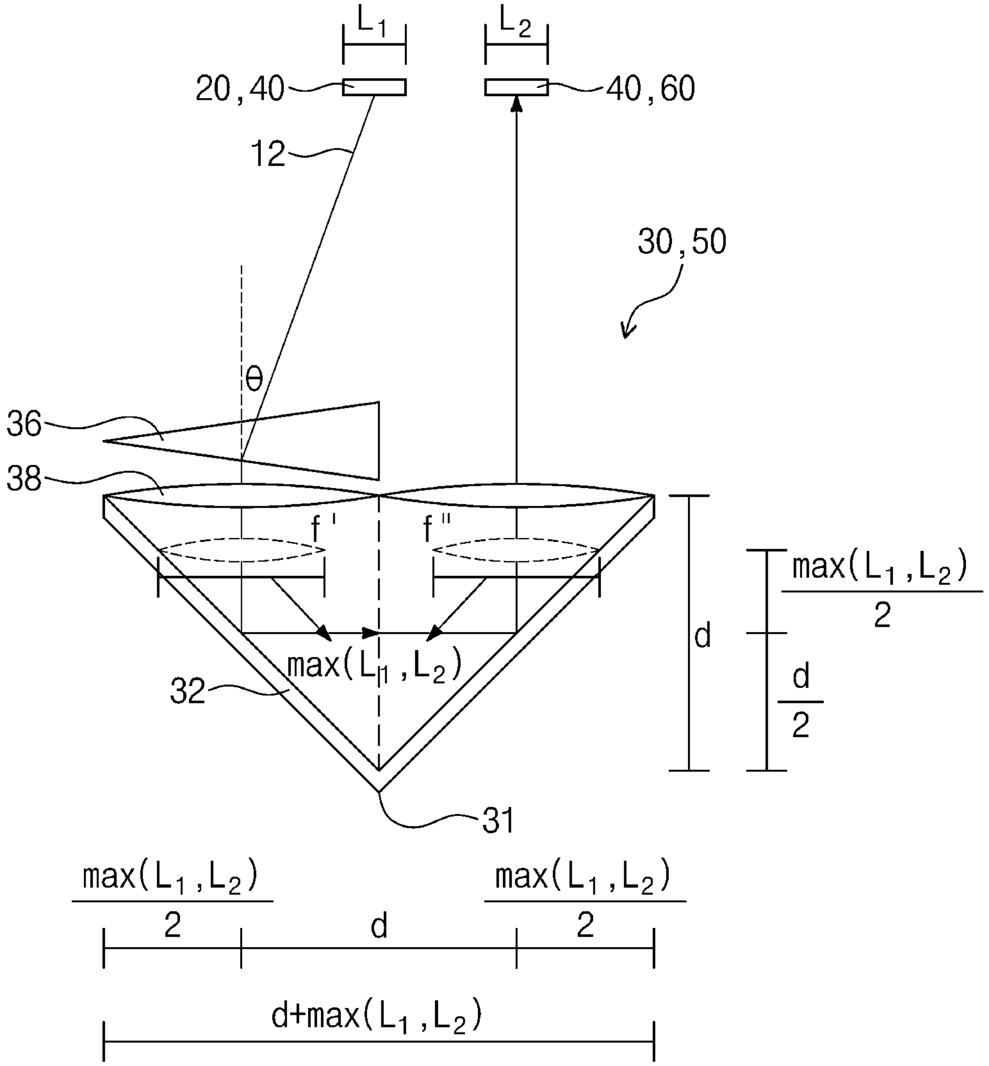
FIG. 4 is a cross-sectional view showing example first and second retroreflective lenses of FIG. 1.

FIG. 4 shows examples of the first retroreflective lens 30 and the second retroreflective lens 50 of FIG. 1. Hereinafter, the description will be based on the first retroreflective lens 30 and the same is similarly applied to the second retroreflective lens 50.

Referring to FIG. 4, the first retroreflective lens 30 may be an asymmetric retroreflective lens. FIG. 4 shows that, among the plurality of wedge prisms 36 of FIG. 3, a wedge prism in the first spatial light modulator 20 side remains and a wedge prism in the second spatial light modulator 40 side is omitted, and vice versa is also possible.

When the wedge prism in the second spatial light modulator 40 side is omitted, the lengths of the optical paths may be differed between the outer optical Fourier transform lenses 38 and the first and second light modulators 20 and 40. The different lengths of the optical paths correspond to different FFL and BFL of the first retroreflective lens 30. The equivalent focal length $f_{eq}$ of the first retroreflective lens 30 is calculated using the different focal lengths f and f' of the outer optical Fourier transform lenses 38 and the width W of the retroreflector 32, and more specifically, the reciprocal of the equivalent focal length $f_{eq}$ may be calculated using the difference between W/ff' and the sum of 1/f and 1/f'. The FFL may be calculated using a multiplication of 1-W/f and the equivalent focal length $f_{eq}$. The BFL may be calculated using a multiplication of 1-W/f' and the equivalent focal length $f_{eq}$. The ratio between the focal lengths f and f' of the outer optical Fourier lenses 38 may be calculated using a condition that the cosine value of the refractive angle θ of the wedge prism 36 in the first spatial light modulator 20 side is equal to the ratio between the FFL and the BFL.

Figure 5:
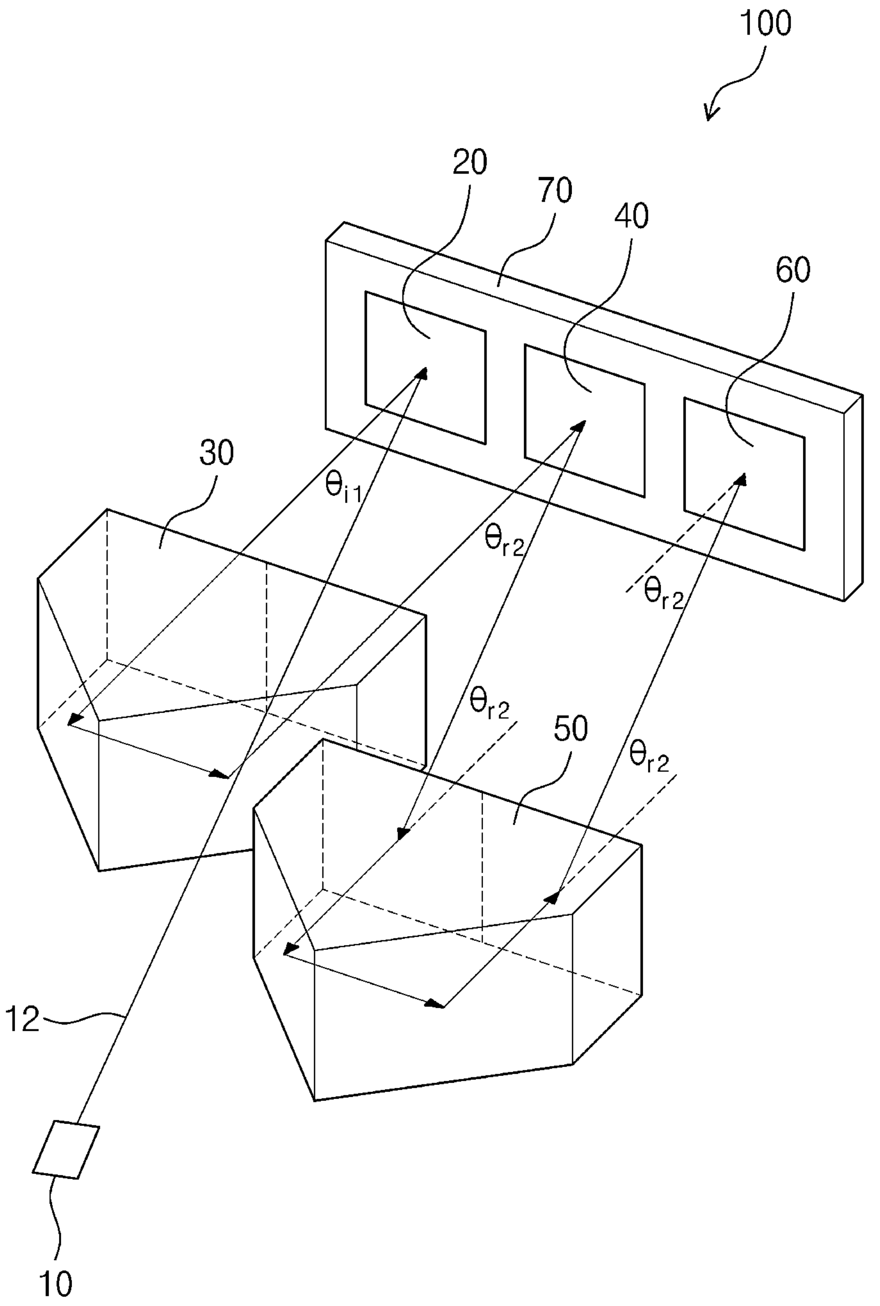
FIG. 5 is a perspective view showing an example optical processing apparatus according to the present inventive concept.

FIG. 5 shows an example optical processing apparatus 100 according to the present inventive concept.

Referring to FIG. 5, the first retroreflective lens 30 of the optical processing apparatus 100 may be aligned with the first spatial light modulator 20 and the second spatial light modulator 40. Each of the first spatial light modulator 20 and the second spatial light modulator 40 may include a digital micro mirror device. The digital micro mirror device may be set so that a first reflection angle $\theta_{i1}$ of the first spatial light modulator 20 and a second incident angle $\theta_{r2}$ of the second spatial light modulator 30 be 0 degrees, which results in an increase in productivity in the packaging process of the optical processing apparatus 100. The first retroreflective lens 30 may be those of FIGS. 2 and 3, and in particular, all the wedge prisms may be omitted. The second retroreflective lens 50 may be those of FIGS. 2 and 3, and the optical path may be adapted to a second reflection angle $\theta_{r2}$ of the second spatial light modulator 40 and an incident angle of the optical detector 60 using the wedge prisms.

The first retroreflective lens 30 and the second retroreflective lens 50 may be disposed at the same distance in the normal direction to a plane of the reference plate 70, and to this end, the first retroreflective lens 30 and the second retroreflective lens 50 may be configured to have different focal lengths.

Figure 6:
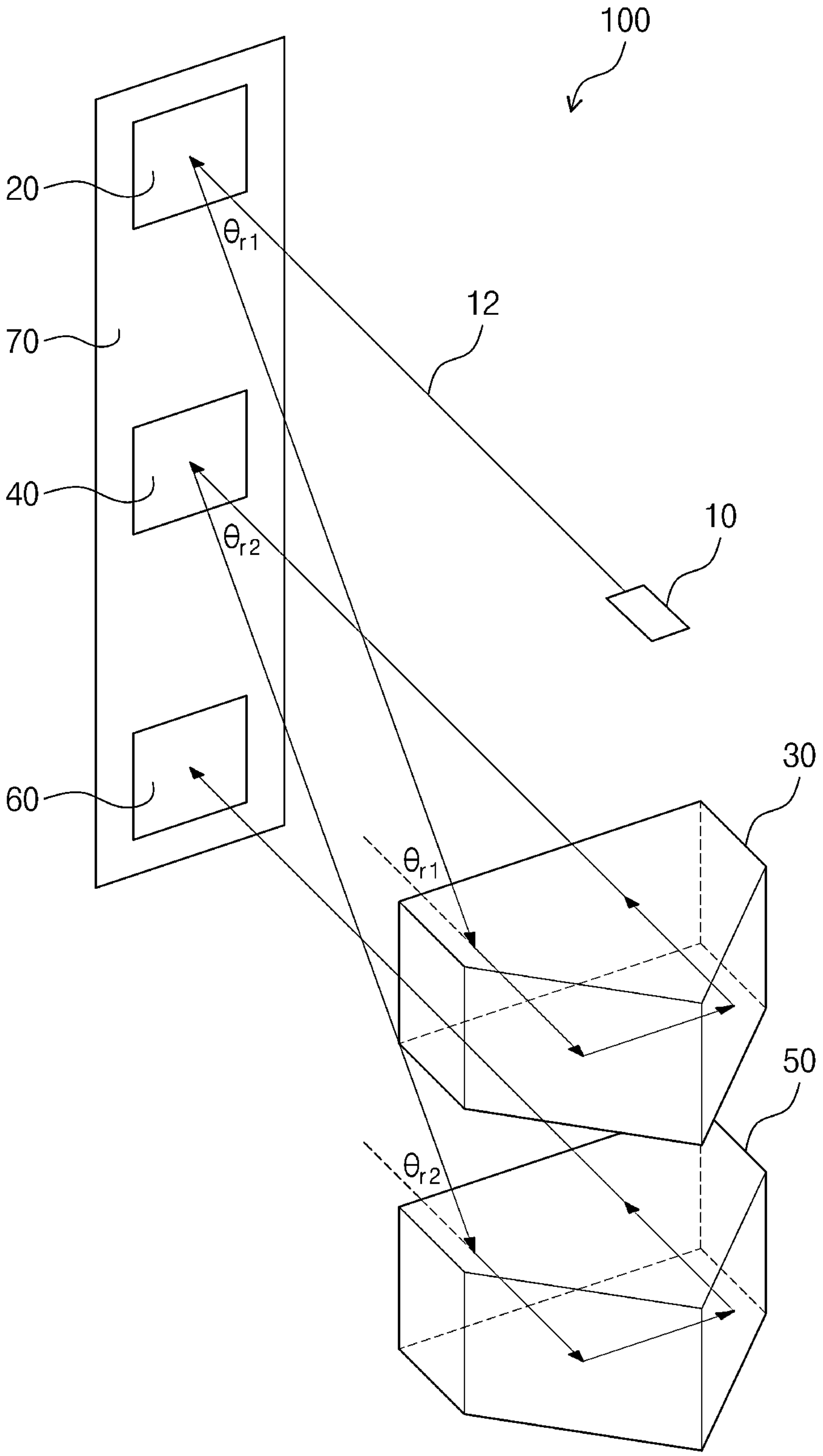
FIG. 6 is a perspective view showing an example optical processing apparatus according to the present inventive concept.

FIG. 6 shows an example optical processing apparatus 100 according to the inventive concept.

Referring to FIG. 6, the first retroreflective lens 50 of the optical processing apparatus 30 may receive the light 12 at inclined angles from the first spatial light modulator 20 and the second spatial light modulator 40. The first retroreflective lens 30 and the second retroreflective lens 50 may be the asymmetric retroreflective lenses of FIG. 4, and each of the first spatial light modulator 20 and the second spatial light modulator 40 may include the digital micro mirror device. The first retroreflective lens 30 and the second retroreflective lens 50 may be disposed at the same distance in the perpendicular direction to a plane of the reference plate 70, and to this end, the first retroreflective lens 30 and the second retroreflective lens 50 may be configured to have different focal lengths.

As described above, the optical processing apparatus may use the first and second retroreflective lenses to easily align the first and second spatial light modulators and the optical detector on a reference plate.

The foregoing description is about detailed examples for practicing the inventive concept. The present disclosure includes not only the above-described embodiments but also simply changed or easily modified embodiments. In addition, the inventive concept may also include technologies obtained by easily modifying and practicing the above-described embodiments.

What is claimed is:

1. An optical processing apparatus comprising:

a light source configured to generate light;

a first spatial light modulator provided on a reference plate and configured to modulate light;

a first retroreflective lens provided over the first spatial light modulator and configured to perform optical Fourier transform on the light;

a second spatial light modulator provided adjacent to the first spatial light modulator on the reference plate and configured to receive the light from the first retroreflective lens to re-modulate the light;

a second retroreflective lens provided over the second spatial light modulator and configured to perform optical inverse Fourier transform on the light; and an optical detector provided adjacent to the second spatial light modulator on the reference plate and configured to receive the light from the second retroreflective lens to acquire an image detection signal.

2. The optical processing apparatus of claim 1, wherein each of the first and second retroreflective lenses comprises a V-shaped retroreflector.

3. The optical processing apparatus of claim 2, wherein each of the first retroreflective lens and the second retroreflective lens further comprises an inner optical Fourier transform lens provided on a center plane of the retroreflector.

4. The optical processing apparatus of claim 3, wherein the inner optical Fourier transform lens of the first retroreflective lens is disposed at a center of an optical path from the first spatial light modulator to the second spatial light modulator, and a focal length of the inner optical Fourier transform lens is half a length of the optical path.

5. The optical processing apparatus of claim 3, wherein the inner optical Fourier transform lens of the second retroreflective lens is disposed at a center of an optical path from the second spatial light modulator to the optical detector, and a focal length of the inner optical Fourier transform lens is half a length of the optical path.

6. The optical processing apparatus of claim 2, wherein each of the first and second retroreflective lenses further comprises at least one wedge prism provided in both sides of the retroreflector individually or in common.

7. The optical processing apparatus of claim 2, wherein each of the first and second retroreflective lenses further comprises a plurality of outer optical Fourier transform lenses in both sides of the retroreflector.

8. The optical processing apparatus of claim 7, wherein a length of an optical path from the first spatial light modulator to the outer optical Fourier transform lens in one side of the retroreflector of the first retroreflective lens is equal to a front focal length of the plurality of outer optical Fourier transform lenses, and a length of an optical path from the outer optical Fourier transform lens in another side of the retroreflector to the second spatial light modulator is equal to a back focal length of the plurality of outer optical Fourier transform lenses.

9. The optical processing apparatus of claim 7, wherein a length of an optical path from the second spatial light modulator to the outer optical Fourier transform lens in one side of the retroreflector of the second retroreflective lens is equal to a front focal length of the plurality of outer optical Fourier transform lenses, and a length of an optical path from the outer optical Fourier transform lens in another side of the retroreflector to the optical detector is equal to a back focal length of the plurality of outer optical Fourier transform lenses.

10. The optical processing apparatus of claim 7, further comprising:

at least one wedge prism provided separately or in common over the outer optical Fourier transform lenses of the first and second retroreflective lenses.

11. The optical processing apparatus of claim 1, wherein one side of the first retroreflective lens is aligned with the first spatial light modulator, and another side is aligned with the second spatial light modulator.

12. The optical processing apparatus of claim 1, wherein the first retroreflective lens is aligned with the first spatial light modulator, and the second retroreflective lens is aligned with the second spatial light modulator.

13. The optical processing apparatus of claim 1, wherein the first retroreflective lens is aligned with the second spatial light modulator, and the second retroreflective lens is aligned with the optical detector.

14. The optical processing apparatus of claim 1, wherein the first retroreflective lens and the second retroreflective lens are arranged at a same distance in a normal direction to a plane of the reference plate.

15. An optical processing apparatus, comprising:

a light source configured to generate light;

a first spatial light modulator provided on a reference plate and configured to modulate light;

a first retroreflective lens provided over the first spatial light modulator and configured to perform optical Fourier transform on the light;

a second spatial light modulator provided adjacent to the first spatial light modulator on the reference plate and configured to receive the light from the first retroreflective lens to re-modulate the light;

a second retroreflective lens provided over the second spatial light modulator and configured to perform optical inverse Fourier transform on the light; and an optical detector provided adjacent to the second spatial light modulator on the reference plate and configured to receive the light from the second retroreflective lens to acquire an image detection signal, wherein each of the first retroreflective lens and the second retroreflective lens comprises:

a retroreflector; and an inner optical Fourier transform lens provided on a center plane of the retroreflector.

16. The optical processing apparatus of claim 15, wherein a width of the retroreflector is equal to or greater than a sum of a distance between the first spatial light modulator and the second spatial light modulator and a larger one of aperture lengths of the first spatial light modulator and the second spatial light modulator, and is equal to or less than double the distance.

17. The optical processing apparatus of claim 15, wherein each of the first retroreflective lens and the second retroreflective lens further comprises at least one wedge prism configured to change a propagation path of the light to align with an optical axis of the inner optical Fourier transform lens.

18. The optical processing apparatus of claim 1, wherein each of the first spatial light modulator and the second spatial light modulator comprises a digital micro mirror device.

19. The optical processing apparatus of claim 14, wherein the first retroreflective lens and the second retroreflective lens are configured to have different focal lengths.

20. The optical processing apparatus of claim 7, wherein apertures of the plurality of outer optical Fourier transform lenses are equal to or greater than a larger one of aperture lengths of the first spatial light modulator and the second spatial light modulator.

* * * * *